(12) United States Patent
Apte et al.

(10) Patent No.: US 8,478,629 B2
(45) Date of Patent: Jul. 2, 2013

(54) SYSTEM AND METHOD FOR COLLABORATIVE MANAGEMENT OF ENTERPRISE RISK

(75) Inventors: Chidanand V. Apte, Chappaqua, NY (US); Eric W. Cope, Langnau am Albis (CH); Lea A. Deleris, Scarsdale, NY (US); Shubir Kapoor, Shrub Oak, NY (US); Kevin P. McAuliffe, Cortlandt Manor, NY (US); Bonnie K. Ray, Nyack, NY (US)

(73) Assignee: International Business Machines Corporation, Armonk, NY (US)

( * ) Notice: Subject to any disclaimer, the term of this patent is extended or adjusted under 35 U.S.C. 154(b) by 258 days.

(21) Appl. No.: 12/836,232

(22) Filed: Jul. 14, 2010

(65) Prior Publication Data
US 2012/0016714 A1   Jan. 19, 2012

(51) Int. Cl.
*G06Q 10/00* (2012.01)

(52) U.S. Cl.
USPC ............... 705/7.28; 703/2; 703/6; 703/22; 703/23; 705/7.12; 707/736; 707/758

(58) Field of Classification Search
USPC .............. 705/7.28, 7.36, 38; 702/179, 181, 702/185; 711/170; 714/25, 38.1, 39; 715/736; 717/120
See application file for complete search history.

(56) References Cited

U.S. PATENT DOCUMENTS

| | | |
|---|---|---|
| 6,223,143 B1 | 4/2001 | Weinstock et al. |
| 2004/0225629 A1 | 11/2004 | Eder |
| 2005/0065754 A1 | 3/2005 | Schaf et al. |
| 2005/0209866 A1 | 9/2005 | Veeningen et al. |
| 2006/0089861 A1 | 4/2006 | King et al. |
| 2006/0100958 A1 | 5/2006 | Cheng et al. |
| 2007/0259377 A1 | 11/2007 | Urdea et al. |
| 2008/0168135 A1 | 7/2008 | Redlich et al. |
| 2009/0030862 A1 | 1/2009 | King et al. |
| 2009/0276233 A1 | 11/2009 | Brimhall et al. |
| 2011/0166930 A1 | 7/2011 | DeCotiis et al. |

OTHER PUBLICATIONS

U.S. Appl. No. 12/690,339, filed Jan. 20, 2010, entitled "Method and System for Business Process Oriented Risk Identification and Qualification", first named inventor: Feng Cheng.
U.S. Appl. No. 12/690,358, filed Jan. 20, 2010 entitled "Method and System Enabling Dynamic Composition of Heterogeneous Risk Models", first named inventor: Chidanand V. Apte.
U.S. Appl. No. 12/640,082, filed Dec. 17, 2009 entitled "System and Method for Distributed Elicitation and Aggregation of Risk Information", first named inventor: Debarun Bhattacharjya.
Cheng, F., "IBM Research Report: Modeling Operational Risks in Business Processes", Jul. 20, 2005.

(Continued)

*Primary Examiner* — Gurkanwaljit Singh
(74) *Attorney, Agent, or Firm* — Scully, Scott, Murphy & Presser, P.C.; Daniel P. Morris, Esq.

(57) ABSTRACT

A method and system for collaboratively managing risk is presented. In one embodiment the method comprises analyzing a node in a risk network when an output of said node violates a control limit, identifying a cause of said violation of said control limit, creating a mitigation action in response to said node violating said control limit, performing said mitigation action, said mitigation action having an influence on said output of said node, and measuring said output of said node to determine effectiveness of said mitigation action on said node, wherein a program using a processor unit executes one or more of said analyzing, identifying, creating, performing and measuring steps.

21 Claims, 6 Drawing Sheets

OTHER PUBLICATIONS

Cheng, J et al., "An Algorithm for Bayesian Belief Network Construction from Data", Proceedings of AI & STAT, 1997, pp. 83-90.

Heckerman, D, et al., "Learning Bayesian Networks. The Combination of Knowledge and Statistical Data", Machine Learing, 1995, 20, pp. 197-243, Kluwer Academic Publishers, Boston.

Lauritzen, S.L. et al., "Local Computations with Probabilities on Graphical Structures and Their Application to Expert Systems", Journal of the Royal Statistical Society, Series B (Methodological), 1988, pp. 157-224, vol. 50, issue 2.

Triple-s—Two can talk—survey description standards http://www.snapsurveys.com/focuson/focuson-december-2000.shtml.

Wright, G., "Triple-S: The Broader Horizon", ASC 2007, The Challenges of a Changing World, Association for Survey Computing.

Wright, G., "The Triple-S Standard", The Triple-S Standard, Association Computing, Sep. 2002.

Cornalba et al., "Statistical Models for Operational Risk Management", 2004, Physics A. Issue 338, pp. 166-172.

Wang, "Building Bayesian Networks: Elicitation, Evaluation, and Learning", University of Pittsburgh, 2004, pp. iv-111.

Bharracharjya et al., "Ordering Nodes for Parameter Elicitation in Bayesian Belief Networks", RC24818 (W0906-119) Jun. 26, 2009, Computer Science.

Nielsen et al., "Probability Elicitation in Bayesian Networks, Automatic Generation of Questionnaires", Department of Communication, Business and Information Technologies, Roskilde University; May 29, 2007, pp. iii-75.

Lau et al., "PROBES: A Framework for Probability Elicitation from Experts", Department of Computer Science, School of Computing National University of Singapore, 1999 AMIA, Inc., pp. 301-305.

SYSTEM AND METHOD FOR COLLABORATIVE MANAGEMENT OF ENTERPRISE RISK

CROSS REFERENCE TO RELATED APPLICATION

This application is related to the following co-pending applications: U.S. patent application Ser. No. 12/690,339 filed on Jan. 20, 2010, entitled "METHOD AND SYSTEM FOR BUSINESS PROCESS ORIENTED RISK IDENTIFICATION AND QUALIFICATION"; U.S. patent application Ser. No. 12/690,358 filed on Jan. 20, 2010 entitled "METHOD AND SYSTEM ENABLING DYNAMIC COMPOSITION OF HETEROGENEOUS RISK MODELS"; and U.S. patent application Ser. No. 12/640,082 filed on Dec. 17, 2009 entitled "SYSTEM AND METHOD FOR DISTRIBUTED ELICITATION AND AGGREGATION OF RISK INFORMATION".

BACKGROUND

The present invention relates generally to risk management and, particularly to a method and system for collaboratively managing risk.

Organizations are increasingly interested in robust systems for assessing and managing risk in general and operational risk in particular. The growing interest in operational risk management has been driven by a variety of factors, including the introduction of regulations requiring businesses to quantify and manage operational risk. In most cases, risk is evaluated based on a risk model that quantifies risk based on a performance metric. Such risk models are of limited use because they do not provide an insight into the underlying risks that affect the performance metric. These risk models are also more beneficial to risk managers, executives, and auditors than to the people who make day-to-day operational decisions within an organization.

Current risk models are static and incapable of mapping an organization's risk to enterprise objectives and business processes. This disconnect between risk models and business processes leads to suboptimal risk mitigation techniques. Further, current risk models do not have continual risk monitoring capabilities and merely report risk based upon historical data, rather than predicting risk based upon the most current data.

Thus, there is a need in the art for a method and system that collaboratively manages risk, and that is also capable of predicting risk, as well as mapping risk to enterprise objectives and business processes.

SUMMARY

A method and system for collaboratively managing risk is presented. In one embodiment the method comprises analyzing a node in a risk network when an output of said node violates a control limit, identifying a cause of said violation of said control limit, creating a mitigation action in response to said node violating said control limit, performing said mitigation action, said mitigation action having an influence on said output of said node, and measuring said output of said node to determine effectiveness of said mitigation action on said node, wherein a program using a processor unit executes one or more of said analyzing, identifying, creating, performing and measuring steps.

In another embodiment, the system comprises a processor operable to analyze a node in a risk network when an output of said node violates a control limit, identify a cause of said violation of said control limit, create a mitigation action in response to said node violating said control limit, perform said mitigation action, said mitigation action having an influence on said output of said node, and measure said output of said node to determine effectiveness of said mitigation action on said node.

In another embodiment, a computer readable medium that embodies the method is also provided.

DESCRIPTION

The following example applies the method and system for collaboratively diagnosing and mitigating risk in the context of quantifying customer satisfaction. In the following examples, "elicitation of risk information" and "eliciting risk information" from an expert is achieved by questioning the expert about a risk event. An expert is a person who has a special skill, knowledge or experience in a particular field. The expert supplies a probability that the risk event will or will not occur. The supplied probabilities are termed risk variables, which are also known in the art as risk nodes.

Figure 1:
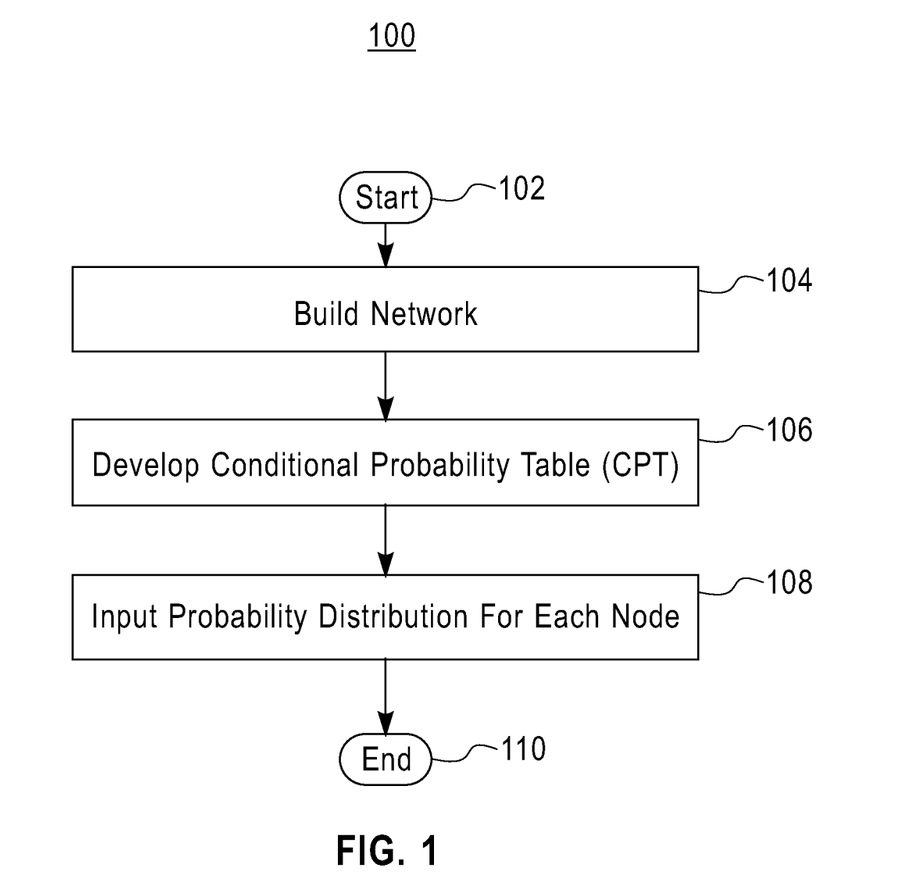
FIG. 1 is an example of a method for composing a Bayesian network.
Figure 2:
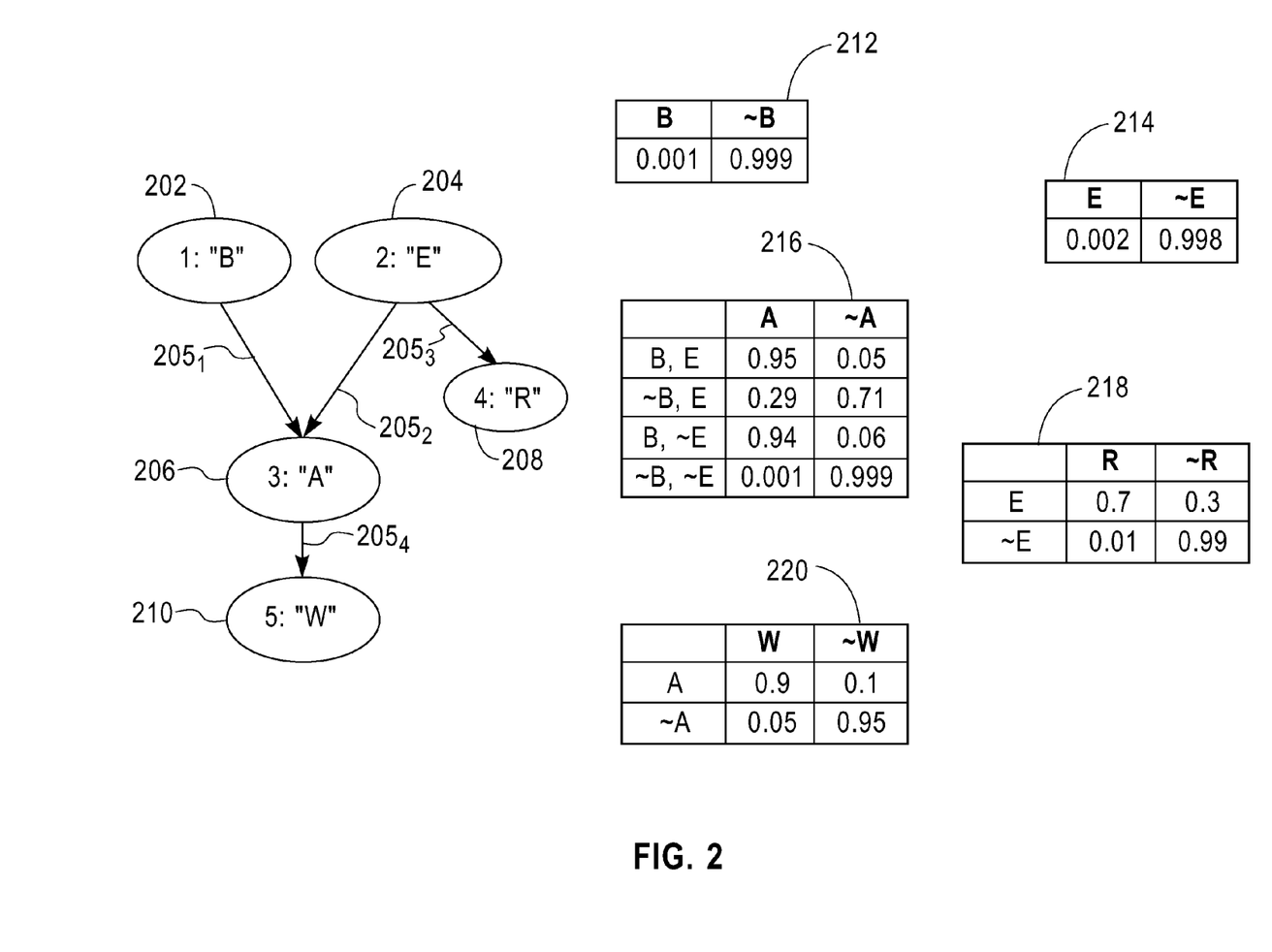
FIG. 2 is an example of a Bayesian network and conditional probability tables associated with the Bayesian network.

FIGS. 1 and 2 taken together illustrate one example of how a Bayesian network 200 may be utilized to compose a risk network. An example Bayesian network 200 shown in FIG. 2 includes a set of nodes 202, 204, 206, 208, and 210 interconnected by arcs 205 in the manner depicted. A Bayesian network, such as the one shown in FIG. 2, represents a joint probability distribution over a set of nodes. The joint distribution of the nodes can be used to evaluate inferences on the network.

FIG. 1 is a method that may be used to build the Bayesian network 200 shown in FIG. 2. The method begins at block 102, and proceeds to block 104. At block 104, a network builder associates each node to one or more nodes in the Bayesian network 200 on the basis of a direct effect of a given node on a target node. The network builder is usually an expert or person who understands how the nodes are associated with each other.

Referring to FIG. 2, an example risk network "build" is shown to include: a node "A" 206 associated with node "B" 202 by arc $205_1$; node "A" 206 also associated with node "E" 204 by arc $205_2$. The presence of an arc 205 indicates a node has an influence upon a target node. For example, node "B" 202 provides an input to target risk node "A" 206, thus the output of node "A" 206 is conditionally dependent upon the input of risk node "B" 202. The absence of an arc 205 between nodes indicates the nodes are conditionally independent from each other.

Referring back to FIG. 1, at block 106, a conditional probability table (CPT), for each node in the Bayesian network "build" 200 is developed by the user and associated with each node. Each entry in the CPT is associated with a real world risk event. Referring back to FIG. 2, conditional probability tables 212, 214, 216, 218, 220 are associated with respective nodes 202, 204, 206, 208 and 210. At step 108, the user also assigns a probability distribution to each risk event in the CPT. The probability distributions may be based on the user's opinion, on one or more expert opinions, or from real world observed data. The sum of all the probabilities for each CPT should total to 1.

The probability of a risk event occurring is conditionally dependent upon the probabilities of the inputs into a node. For example, node "A" 206 accepts two inputs: one from node "B" 202 and one from node "E" 204. Therefore, the probability of a risk event occurring at node "A" 206 is directly based upon the probability of a risk event occurring at node "B" 202 and node "E" 204. Mathematically, there are four possible combinations of "B" and "E" (shown as table 216) that can influence node "A" 206: B & E, B & ~E, ~B & E, and ~B & ~E. The probabilities associated with the four possible combinations of "B" and "E" sum to 1, i.e., node "A" is conditionally dependent upon the probabilities associated with "B" and "E". The method ends at step 110.

Figure 3:
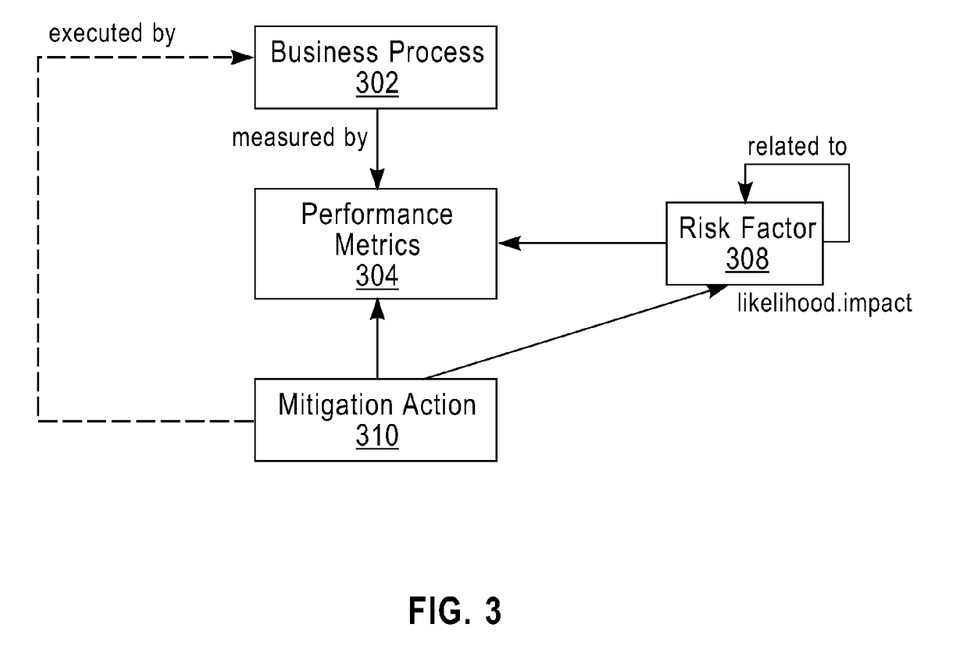
FIG. 3 is an example of example of a generalized risk adjusted performance model.

FIG. 3 is an example of a generalized risk adjusted performance model. In one embodiment, the risk adjusted performance model is used to monitor the performance of a business process and the model is comprised of several nodes. The risk adjusted performance model may be constructed as a Bayesian network. In one embodiment, the performance of a business process is measured by the probability distribution of the success of the business process. As in the Bayesian network described above, the probability distribution associated with the business process is conditionally dependent upon the probability distributions of the inputs from the nodes connected to the node associated with the business process.

Several of the nodes within the performance model serve a specific function. In one embodiment, the performance model comprises one or more risk nodes, a performance node and one or more mitigation action nodes. A performance node represents one (or more metrics) whose values are used to assess the performance of the business process, e.g., cost, time, or quality. The value of a performance metric is assumed to be influenced by one or more risk nodes. A risk node represents a random variable whose occurrence is believed to impact the value of an associated performance node. For example, power outage can be represented as a risk node, where the underlying random variable follows a Bernoulli distribution with some probability of occurrence, p, in a specified time interval. A mitigation action node represents a decision that, when taken, acts to change either the conditional probability distribution of a risk node, the conditional probability distribution of a performance node, or a combination of these nodes. Mitigation action nodes typically have a cost attribute associated with them, such as a time cost or a monetary cost. Mitigation actions may be selected by a user on the basis of a cost constraint, a time constraint, or an expected effectiveness of the mitigation action on the performance node.

As an example, in FIG. 3, the effectiveness of a business process 302 (e.g., customer service) is measured by performance node 304. Performance node 304 receives input from risk node 308 and mitigation action node 310. In one embodiment, the inputs into the performance node 304 are probability distributions associated with risk node 308 and mitigation action node 310. Risk node 308 may include work stoppages, floods, earthquakes, an increase in the price of natural resources, a shortage of natural resources, etc. and may have a deleterious effect on the output of performance node 304. For example, the occurrence of a natural disaster like a volcanic eruption (modeled as a Risk Node 308) can have a deleterious effect on business process 302 and specifically on the customer service performance node 304. In one embodiment, a business process 302 is considered to have failed when the output or metric associated with performance node 304 falls below a threshold value.

The mitigation action node 310 is also coupled to risk node 308. Although not shown, there may be more than one mitigation action node 310, for example individual mitigation action nodes may be coupled to risk node 308. The mitigation action node 310 comprises actions that may be undertaken by an organization to increase the output of the performance node 304 and decrease any deleterious effects from the risk node 308. For example, if the business process 302 relies upon one supplier for a majority of its component products, and that particular supplier is unable to meet the demand for components, then the output of performance node 304 will decrease. An example of a mitigation action 310 that could have a direct influence on risk node 308 is to increase security procedures within a data center to prevent unauthorized access, reducing the probability of unavailability of IT infrastructure (Risk node 308) and improving overall Customer Satisfaction (Performance Node 304). The effectiveness of mitigation action node 310 can be directly measured by the increase or decrease in the probability of the output of performance node 304 remaining above the threshold value.

Figure 4:
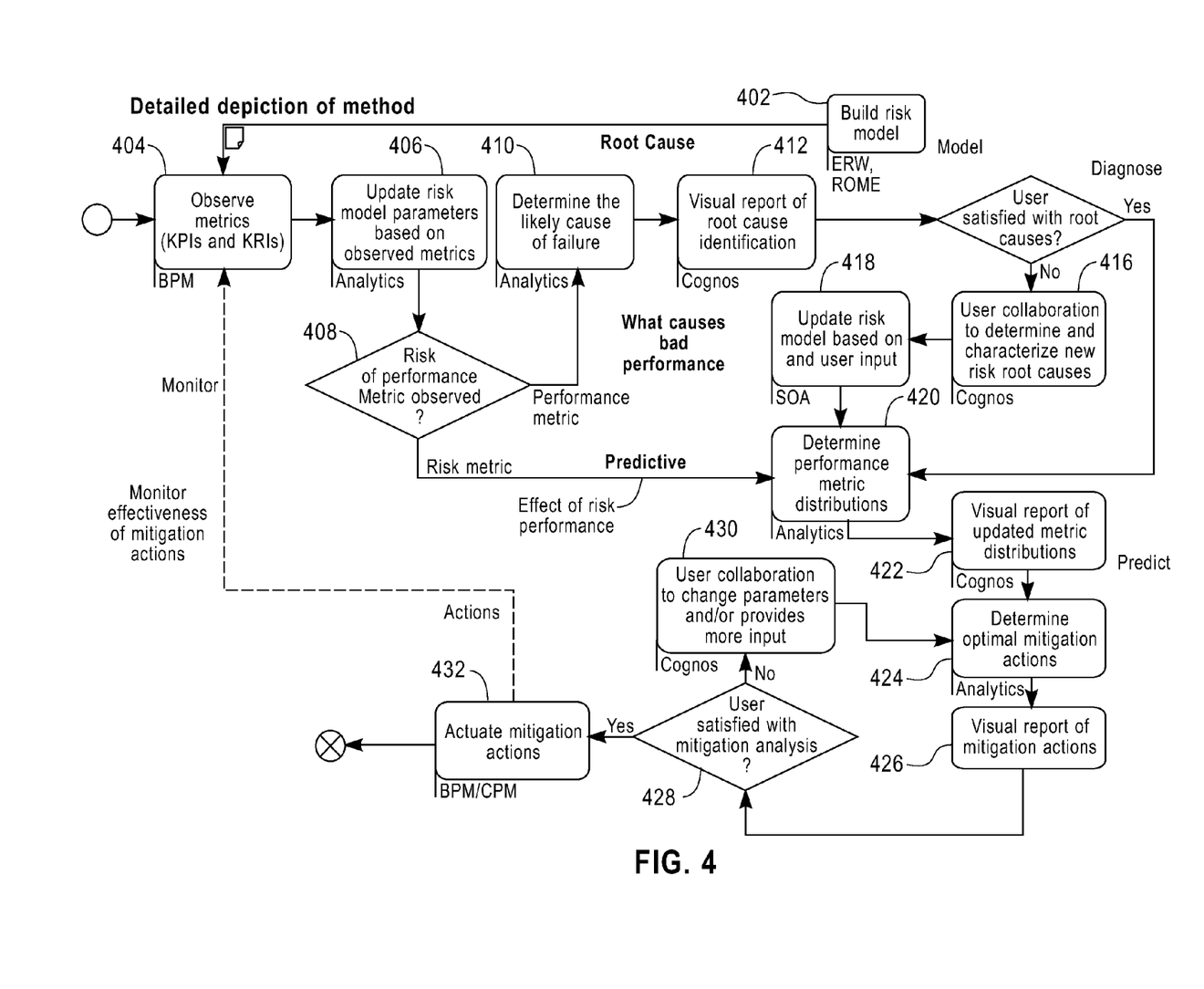
FIG. 4 is an example of a method for collaboratively diagnosing risk.
Figure 5:
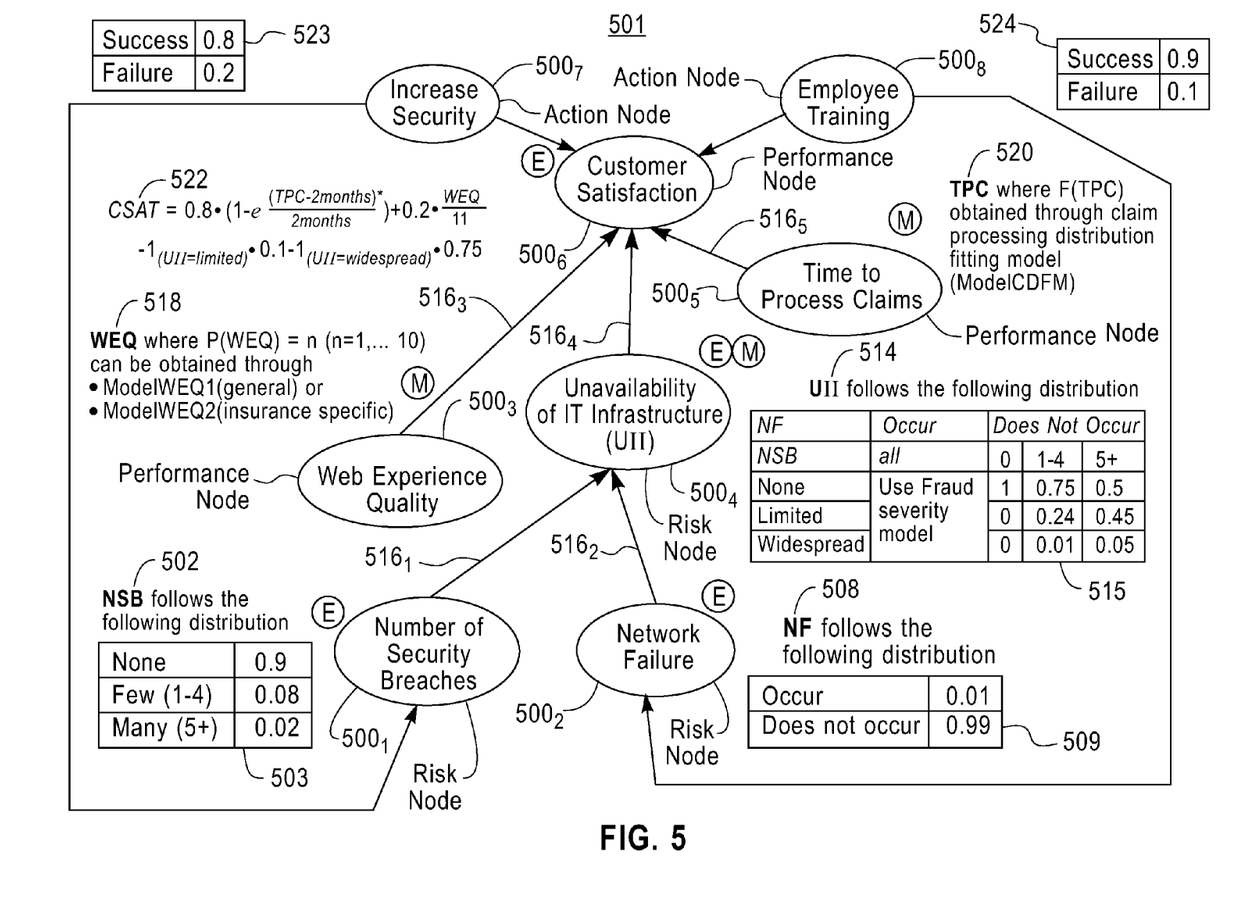
FIG. 5 is an example of a risk network that can benefit from the method of the present invention.

FIGS. 4 and 5 together illustrate how the present invention may be used to collaboratively manage and diagnose risk in accordance with the present invention. However it is understood that the invention is applicable to any risk network that measures performance as influenced by a number of different risk nodes.

FIG. 4 is an example of a method for collaboratively diagnosing risk in accordance with one embodiment of the present invention. FIG. 5 is an example of a risk network that can benefit from the method of the present invention. The method starts at step 402. At step 402, a risk network, such as the risk network 501 one shown in FIG. 5, is composed by a network builder. In one embodiment, the risk network 501 is built as described above with regard to FIGS. 1 to 3.

As shown in FIG. 5, the risk network 501 may be modeled as a Bayesian belief network. The risk network 501 comprises nodes $500_1$, $500_2$, $500_3$, $500_4$, $500_5$, $500_6$, $500_7$ and $500_8$. As shown, three different types of nodes form this particular risk network 501: risk nodes, performance nodes, and mitigation action nodes.

The customer satisfaction (CSAT) risk model 522 is associated with node $500_6$, the time to process claims (TPC) risk model 520 is associated with node $500_5$, the web experience quality (WEQ) risk model 518 is associated with node $500_3$, and the Unavailability of IT Infrastructure (UII) risk model 514 associated with node $500_4$. The number of security breaches (NSB) risk model 502 is associated with node $500_1$ and Network Failure (NF) risk model 508 is associated with node $500_2$.

Nodes $500_1$, $500_2$ and $500_4$ are risk nodes. Nodes $500_3$, $500_5$ and $500_6$ are performance nodes. Nodes $500_7$ and nodes $500_8$ are mitigation action nodes. The nodes, $500_1$ to $500_8$, are directly or indirectly interconnected with each other by arcs 516, and each node 500 is associated with a set of possible risk models. Mitigation action nodes $500_7$ and $500_8$ are associated with an implementation cost (Not shown) and can be associated with a probability of success (shown in tables 523 and 524, respectively). In addition, the effect of a mitigation action on a node is captured by an additional CPT which describes the behavior of the node given the mitigation action is successful. As an example, the CPT 503 for the Number of Security Breaches (NSB) 502 shown in FIG. 5 may change if the mitigation action is successful: For instance, a CPT for the Number of Security Breaches given security has been increased may be as follows:

|      |      |
|------|------|
| None | 0.95 |
| Few  | 0.04 |
| Many | 0.01 |

In one example, mitigation actions are the result of a collaborative effort of one or more users of the system. In one embodiment, mitigation actions are elicited from one or more experts. These experts may be the same experts that evaluate the elicited risk nodes described below. In one embodiment, the effect of a mitigation action may be found by adjusting the conditional probabilities associated with a risk node in accordance with the effect of a mitigation action, and then using the updated conditional probability values associated with the risk node to recalculate the value associated with the performance node. For example, assume that mitigation action 'employee training' is successful in reducing the occurrence of an 'Network Failure' from 0.01 to a lower value, such as 0.001. The updated value associated with risk node $500_2$, e.g., 0.001, is supplied to risk node $500_4$ and used to update the values in the CPT 515 associated with 'Unavailability of IT Infrastructure' 514. The output of risk node $500_4$ is utilized by performance node $500_6$ to calculate a value for 'customer satisfaction'. Thus, a change in risk node $500_2$ (or any of the risk nodes or any of the performance nodes) will cause a change in the output of performance node $500_6$ as calculated according to risk equation 522.

Referring back to FIG. 4, at step 404, each of the risk nodes 500 within the risk network 501 are observed and their output measured. An exemplary method and system for observing, quantifying, and measuring the effect of a risk node on a risk network is provided by co-pending U.S. patent application Ser. No. 12/690,358 entitled "SYSTEM AND METHOD ENABLING COMPOSITION OF HETEROGENEOUS RISK MODELS" filed on Jan. 20, 2010 which is hereby incorporated by reference in its entirety.

Continuing at step 406, the risk node parameters are updated based on the observations made at step 404. An exemplary method for updating a risk node is provided in U.S. patent application Ser. No. 12/690,358. At decision step 408, a determination is made as to whether a metric associated with a "risk event" or a "performance measure" has violated a control limit, i.e., "failed". Referring again to FIG. 5, "customer satisfaction" 522 is an example of a "performance measure" and "number of security breaches" 502 and "Network Failure" 508 are examples of "risk events". The computation of a value for "customer satisfaction" 522 is one example of a metric associated with a "performance measure"; the outputs of "number of security breaches" 502 and "Network Failure" (NF) 508 are examples of metrics associated with risk events. A metric may violate a control limit when it exceeds or falls below a threshold value. Control limits are preset by the user, and may be based upon time constraints, cost constraints, or any number of factors related to a particular risk node. Referring back to FIG. 4, if a "performance measure" has violated a control limit, then the method proceeds to step 410. If a "risk event" has violated a control limit, then the method proceeds to step 420.

At step 410, a determination is made as to why the "performance measure" failed or violated the control limit. The determination is made by traversing the risk network and identifying the likely candidates among the risk nodes (risk nodes that may have failed or violated a preset control limit and that also influence the performance measure). In one embodiment, failure of a risk node occurs when a certain event occurs, for example, a security breach of a computer network as shown in FIG. 5. Failure of a risk node may also be caused by an accumulation of events, i.e., an individual risk node does not fail, but the combination of all the risk nodes leads to failure of the performance measure influenced by the risk nodes.

At step 412, a report is generated that indicates the most likely cause or "root cause" of failure. The report may be a table or a list of risk nodes that influence the performance measure and a likelihood or probability that the risk node is the cause of the failure. In other embodiments, the report may be a bar graph, a line graph, or a risk matrix that depict the likelihood of risk and the impact of risk on a performance measure. An example of such reports may be found in co-pending U.S. patent application Ser. No. 12/690,339 entitled "METHOD AND SYSTEM FOR BUSINESS PROCESS ORIENTED RISK IDENTIFICATION AND QUALIFICATION" filed Jan. 20, 2010, the contents and disclosure of which are incorporated by reference in their entirety.

At decision step 414, the user determines whether he is satisfied the "root cause" of the failure of the "performance measure" as identified by the report at step 412. If the user is not satisfied, then the method proceeds to step 416. If the user is satisfied, then the method proceeds to step 420.

At step 416, the user collaborates with other users to determine and characterize the cause of the failure. The information gathered at step 416 may be elicited from expert opinion or derived from historical data. An exemplary method and system for collaboratively gathering expert opinion is described in co-pending U.S. patent application Ser. No. 12/640,082 entitled "SYSTEM AND METHOD FOR DISTRIBUTED ELICITATION AND AGGREGATION OF RISK INFORMATION" filed Dec. 17, 2009, the contents and disclosure of which are incorporated by reference in their entirety. At step 418, the user updates the risk model at the risk node responsible for the failure of the "performance measure" based on the information gathered at step 416.

At step 420, a probabilistic distribution of the failed "performance measure" and other impacted performance measures are computed. The distributions provide a prediction of the future state of the performance measures based on the observations recorded for the risk node from step 404 or updated risk node from step 418. In some embodiments, more than one probabilistic distribution for the "performance measure" may be computed as a "before and after scenario", i.e., a probabilistic distribution based upon the observed risk nodes diagnosed at step 404 as the "before" scenario and a probabilistic distribution based upon the updated risk nodes from step 418 as the "after" scenario. In yet another embodiment, the risk nodes that influence the "performance measure" may have their parameter values incrementally set to their respective possible values and a probabilistic distribution of the "performance measure" computed for each possible combination of risk node. In yet another embodiment, only the risk nodes that have violated a control limit are incrementally set to their respective possible values (within the control limit) and a probabilistic distribution of the "performance measure" is computed. At step 422, a report is generated for a user that provides the probabilistic distribution of the "performance measure" in relation to changes and adjustments in the risk nodes that influence the "performance measure".

Then, continuing at step 424, an optimal mitigation strategy or strategies are selected to bring the "performance measure" back within the control limit. The mitigation strategy may be selected based upon the amount of time necessary to implement the strategy, the cost of the mitigation strategy, the impact on the performance measure or any other selection criteria.

At step 426, a further report providing detail about the mitigation strategies selected at step 424 are provided to the user. In one embodiment, the report includes a description of the node associated with the mitigation strategy, the adjustments made to the probability distributions associated with the node to mitigate the effect on the "performance measure", the expected impact on the "performance measure", and at least one of cost to implement the mitigation strategy, an expected amount of time to implement the mitigation strategy, and an expected likelihood of success if the mitigation strategy is implemented. In another embodiment, the report includes a description of the node associated with the mitigation strategy, the adjustments made to the node to mitigate the effect on at least one other performance measure within the network that is also impacted by the risk node and that could potentially cross tolerance boundaries at a future time if no mitigation action was taken, the expected impact on the performance measures, and at least one of cost to implement the mitigation strategy, an expected amount of time to implement the mitigation strategy, and an expected likelihood of success if the mitigation strategy is implemented.

Continuing from 426 to decision step 428, at decision step 428, the user determines whether he is satisfied with the mitigation analysis. If the user is satisfied, then the method proceeds to step 432. If the user is not satisfied, then the method loops to step 430. At step 430, the user may collaborate with other users to update or change the parameters at a node or nodes associated with the selected mitigation strategy. The user may also collaborate with other users to devise and select a new mitigation strategy for evaluation. Once a new mitigation strategy is selected or the parameters for the existing mitigation strategy are updated, the method loops back to step 426 and another report is provided to the user. The user may then use the report to determine if he is satisfied with the new or updated mitigation strategy.

Otherwise, at step 432, once a proper mitigation strategy is agreed upon, the mitigation strategy is actuated by the user. Thus, the method enables collaborative diagnosis of failure of a "performance measure" by identifying the root cause risk metric, a prediction of the effects on other performance measures and the selection of an optimal mitigation strategy to correct the performance measure and prevent future performance measure failures.

Figure 6:
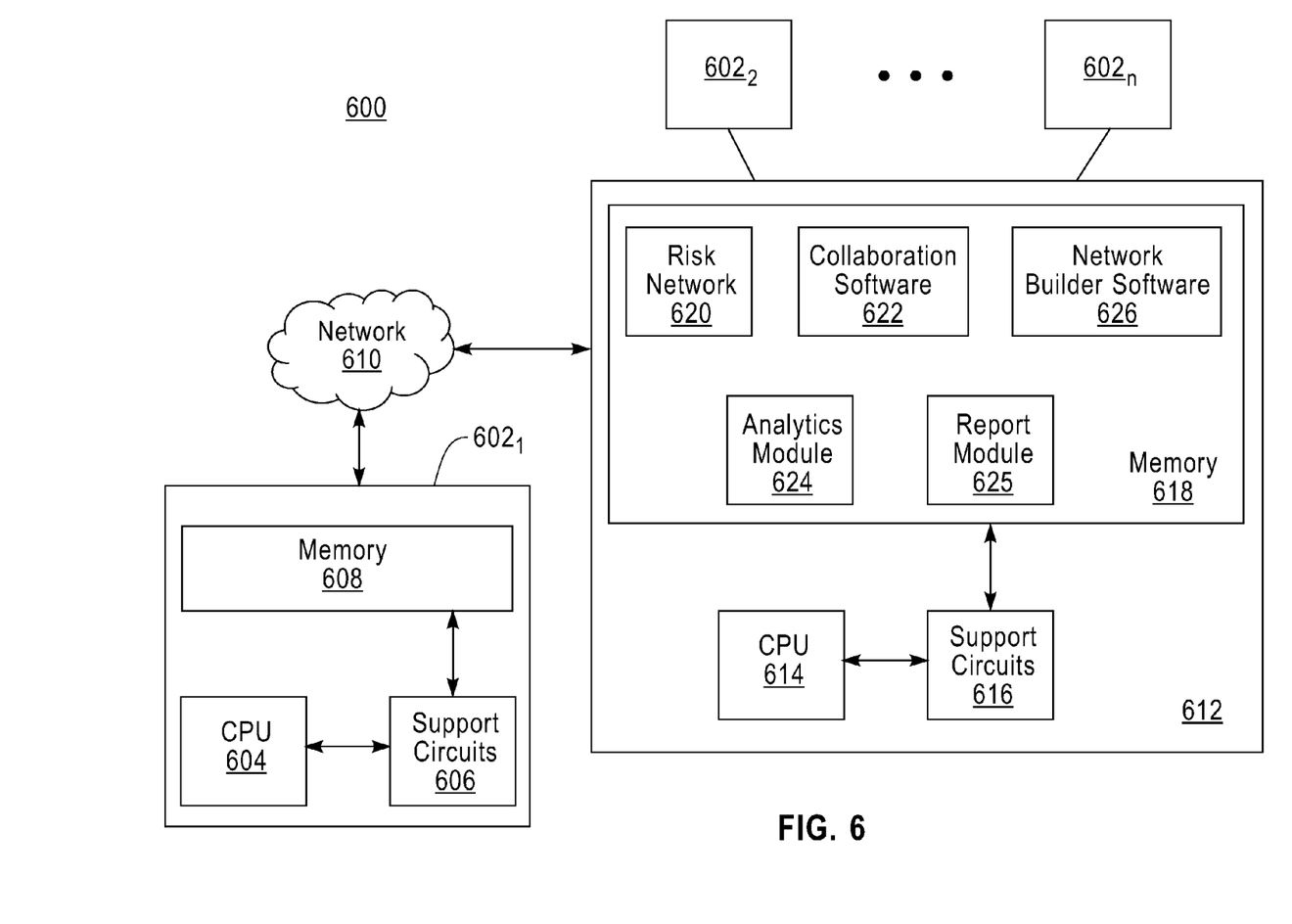
FIG. 6 is an example of an architecture and computing environment in accordance with one embodiment of the present invention.

FIG. 6 is an overview of an architecture and computing environment that can benefit from the present invention. The computing environment 600 comprises a client computer 602₁ connected a risk server 612 via a network 610 such as the Internet, Ethernet, private local area network (LAN) or wide area network (WAN). The client computers 602₂ to 602ₙ may also be directly connected to the risk server 612. The client computer 602 may be any computing device, such as a desktop computer, a laptop computer, a personal digital assistant (PDA) or any other device that can benefit from a connection to the network 610.

The client computer 602 comprises a processor or central processing unit (CPU) 604, support circuits 606 and a memory 608. The CPU 604 is interconnected to the memory 606 via the support circuits 606. The support circuits 606 include cache, power supplies, clocks, input/output interface circuitry, and the like.

The memory 608 may include random access memory, read only memory, removable disk memory, flash memory, and various combinations of these types of memory. The memory 608 is sometimes referred to as a main memory and may in part be used as cache memory.

Similarly, the risk server 612 comprises a processor or central processing unit (CPU) 614, support circuits 616 and a memory 618. The CPU 614 is interconnected to the memory 618 via the support circuits 618. The support circuits 618 include cache, power supplies, clocks, input/output interface circuitry, and the like.

The memory 618 may include random access memory, read only memory, removable disk memory, flash memory, and various combinations of these types of memory. The memory 618 is sometimes referred to as a main memory and may in part be used as cache memory. The memory 618 stores a risk network 620, "collaboration software" 622 for collaboratively diagnosing the risk network, an analytics module 624 and report module 625. In one embodiment, the "collaboration software" 622 is software as described in co-pending U.S. patent application Ser. No. 12/640,082 "SYSTEM AND METHOD FOR DISTRIBUTED ELICITATION AND AGGREGATION OF RISK INFORMATION". Optionally, the memory may store "risk network builder software" 626 as described in co-pending U.S. patent application Ser. No. 12/690,339 entitled "METHOD AND SYSTEM FOR BUSINESS PROCESS ORIENTED RISK IDENTIFICATION AND QUALIFICATION".

A user makes a request to the risk server 612 to analyze the risk network 620. The request may be in response to failure of a "performance measure" associated with the risk network 620, or the request may be to predict the effect of changes to a risk node on a "performance measure" in a series of "what if scenarios".

The "collaboration software" 622 provides a collaborative environment including an interface to elicit expert opinion for at least the failed nodes, i.e., the nodes that have violated a control limit or threshold value in the risk network. In one embodiment, as shown in FIGS. 2, 3 and 5, risk events are characterized by probabilities. The "collaboration software" 622 allows a user or an expert to assign values or a probabilistic distribution to a risk node in the risk network 620. The "collaboration software" 622 also allows experts to be properly matched to a risk node based upon their knowledge and expertise.

The risk nodes are updated with new probability distributions after the elicitation of expert opinions. The analytics module 624 reanalyzes the risk network 620 and recalculates the "performance measures" associated with the risk network 620. The report module 625 generates a report and provides the report to the user that initiated the request to analyze the risk network 620. The report may indicate which "performance measure" failed, which risk node violated a control limit or is the most likely cause of failure of the "performance measure", a recommended mitigation strategy, and a cost, an amount of time, or a likelihood of success for the recommended mitigation strategy.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIGS. 1 through 6. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the present invention has been particularly shown and described with respect to preferred embodiments thereof, it will be understood by those skilled in the art that the foregoing and other changes in forms and details may be made without departing from the spirit and scope of the present invention. It is therefore intended that the present invention not be limited to the exact forms and details described and illustrated, but fall within the scope of the appended claims.

The invention claimed is:

1. A method for mitigating risk comprising:
   developing a risk network comprising of risk nodes;
   analyzing a node in said risk network when an output of said node violates a control limit;
   updating said risk model to reflect an observed control limit violation;
   identifying, from said risk model, a source of said violation of said control limit;
   determining whether an existing risk factor influencing said source has changed;
   collaboratively performing a root cause analysis based on user feedback;
   updating said risk model to reflect new any updated risk factor and associated probability;

evaluating consequences of changes on one or more performance metrics;
analyzing the risk network and creating a mitigation action in response to changes in said one or more performance metrics;
collaboratively setting parameters for said mitigation actions;
performing said mitigation action, said mitigation action having an influence on said output of said node; and
measuring said output of said node to determine effectiveness of said mitigation action on said node, wherein a program using a processor unit executes one or more of said analyzing, identifying, creating, performing and measuring steps.

2. The method of claim 1, wherein said node includes one of: a performance node, a mitigation action node or a risk node, a performance node being influenced by at least one of said mitigation action node and said risk node.

3. The method of claim 1, wherein said mitigation action has an influence on at least one of a performance node and a risk node.

4. The method of claim 1, wherein the step of identifying said source further comprises a collaborative determination of causes by one or more users, and said source is selected from said collaborative determination of causes.

5. The method of claim 1, wherein the step of creating said mitigation action further comprises a collaborative determination of mitigation actions by one or more users, and said mitigation action is selected from said collaborative determination of mitigation actions.

6. The method claim 1, further comprising:
generating a report that comprises information about said performance node, information about said control limit and information about effectiveness of said mitigation action.

7. The method of claim 1, wherein said node continues to violate said control limit after performing said mitigation action, said method further comprising:
eliciting an opinion from a user to diagnose a cause of said node violating said control limit;
updating one or more nodes in said risk network based on the elicited opinion; and
re-measuring said output of said performance node.

8. The method of claim 1, wherein performing a mitigation action further comprises selecting a mitigation action on a basis of at least one of a cost constraint, a time constraint, and an expected effectiveness constraint.

9. A computer program product for mitigating risk comprising:
a tangible storage medium readable by a processor and storing instructions for operation by the processor for performing a method comprising:
developing a risk network comprising of risk nodes;
analyzing a node in said risk network when an output of said node violates a control limit;
updating said risk model to reflect an observed control limit violation;
identifying, from said risk model, a source of said violation of said control limit;
determining whether an existing risk factor influencing said source has changed;
collaboratively performing a root cause analysis based on user feedback;
updating said risk model to reflect new any updated risk factor and associated probability;
evaluating consequences of changes on one or more performance metrics;
analyzing the risk network and creating a mitigation action in response to changes in said one or more performance metrics;
collaboratively setting parameters for said mitigation actions;
performing said mitigation action, said mitigation action having an influence on said output of said node; and
measuring said output of said node to determine effectiveness of said mitigation action on said node.

10. The computer program product of claim 9, wherein said node includes one of: a performance node, a mitigation action node or a risk node, a performance node being influenced by at least one of said mitigation action node and said risk node.

11. The computer program product of claim 9, wherein said mitigation action has an influence on at least one of a performance node and a risk node.

12. The computer program product of claim 9, wherein the step of identifying said source further comprises a collaborative determination of causes by one or more users, and said source is selected from said collaborative determination of causes.

13. The computer program product of claim 9, wherein the step of creating said mitigation action further comprises a collaborative determination of mitigation actions by one or more users, and said mitigation action is selected from said collaborative determination of mitigation actions.

14. The computer program product of claim 9, further comprising:
generating a report that comprises information about said performance node, information about said control limit and information about effectiveness of said mitigation action.

15. The computer program product of claim 9, wherein said node continues to violate said control limit after performing said mitigation action, said method further comprising:
eliciting an opinion from a user to diagnose a cause of said node violating said control limit;
updating one or more nodes in said risk network based on the elicited opinion; and
re-measuring said output of said performance node.

16. The computer program product of claim 9, wherein performing a mitigation action further comprises selecting a mitigation action on a basis of at least one of a cost constraint, a time constraint, and an expected effectiveness constraint.

17. A system for mitigating risk, the system comprising a memory storage device and a processor unit in communication with said memory storage device, said processor unit operable to:
develop a risk network comprising of risk nodes;
analyze a node in said risk network when an output of said node violates a control limit,
update said risk model to reflect an observed control limit violation;
identify, from said risk model, a source of said violation of said control limit,
determine whether an existing risk factor influencing said source has changed;
collaboratively perform a root cause analysis based on user feedback;
update said risk model to reflect new any updated risk factor and associated probability;
evaluate consequences of changes on one or more performance metrics;
analyze the risk network and create a mitigation action in response to changes in said one or more performance metrics,
collaboratively set parameters for said mitigation actions;

perform said mitigation action, said mitigation action having an influence on said output of said node, and measure said output of said node to determine effectiveness of said mitigation action on said node.

18. The system of claim 17, wherein said node includes one of: a performance node, a mitigation action node or a risk node, a performance node being influenced by at least one of said mitigation action node and said risk node.

19. The system of claim 17, wherein said mitigation action has an influence on at least one of a performance node and a risk node.

20. The system of claim 17, wherein the processor is further operable to generate a report that comprises information about said performance node, information about said control limit and information about effectiveness of said mitigation action.

21. The system of claim 17, wherein said node continues to violate said control limit after said processor performs said mitigation action, the processor further operable to elicit an opinion from a user to diagnose a cause of said node violating said control limit, update one or more nodes in said risk network based on the elicited opinion and re-measure said output of said performance node.

* * * * *